United States Patent
Ikari et al.

(10) Patent No.: US 7,433,777 B2
(45) Date of Patent: Oct. 7, 2008

(54) ENGINE PROTECTION SYSTEM AND METHOD FOR CONSTRUCTION MACHINE

(75) Inventors: Takanobu Ikari, Tsuchiura (JP);
Yoshinori Ohwada, Kasumigaura (JP);
Yoshinori Furuno, Tsuchiura (JP);
Shinji Akino, Ushiku (JP); Daisuke Takagi, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 42 days.

(21) Appl. No.: 10/590,218

(22) PCT Filed: Nov. 7, 2005

(86) PCT No.: PCT/JP2005/020388

§ 371 (c)(1),
(2), (4) Date: Aug. 22, 2006

(87) PCT Pub. No.: WO2006/057153

PCT Pub. Date: Jun. 1, 2006

(65) Prior Publication Data

US 2007/0171035 A1      Jul. 26, 2007

(30) Foreign Application Priority Data

Nov. 25, 2004   (JP)   ............................... 2004-339842

(51) Int. Cl.
G06F 19/00 (2006.01)
B60Q 1/00 (2006.01)
F02D 41/14 (2006.01)
G01M 15/05 (2006.01)

(52) U.S. Cl. ....................... 701/103; 701/115; 340/439; 123/676; 73/114.61

(58) Field of Classification Search ......... 701/101–105, 701/110–115; 73/116, 117.2, 117.3, 114.01, 73/114.61; 123/676, 350; 340/438, 439
See application file for complete search history.

(56) References Cited

U.S. PATENT DOCUMENTS

| 4,114,442 | A | * | 9/1978 | Pratt | ........................... 702/130 |
| 4,122,720 | A | * | 10/1978 | Podl | ........................... 340/449 |
| 5,123,397 | A | * | 6/1992 | Richeson | ............... 123/568.14 |

(Continued)

FOREIGN PATENT DOCUMENTS

JP        3-28044        2/1991

(Continued)

*Primary Examiner*—Willis R Wolfe, Jr.
(74) *Attorney, Agent, or Firm*—Mattingly, Stanger, Malur & Brundidge, PC (57) ABSTRACT

An engine protection system for a construction machine can individually diagnose the exhaust temperature specific to each cylinder of an engine corresponding to an engine revolution speed in order to find an abnormal condition of each engine cylinder in advance. A revolution speed sensor 14 detects revolution speed of an engine mounted in the construction machine and, a plurality, e.g., 16, cylinder temperature sensors 20a-20p detect exhaust temperatures of respective cylinders of the engine. A data recording unit 26 and a display controller 24 store the detected engine revolution speed and the detected exhaust temperatures of the respective cylinders. Trend data, which is produced based on the stored data, is sent to an office via a portable terminal and the display controller 24 outputs, a signal for playing back and displaying snapshots based on the stored data to a display unit 23 disposed in the cab 5.

8 Claims, 5 Drawing Sheets

U.S. PATENT DOCUMENTS

| | | | |
|---|---|---|---|
| 5,157,965 A | * 10/1992 | Koegeler et al. | 73/116 |
| 6,067,498 A | * 5/2000 | Akiyama | 701/110 |
| 7,039,518 B2 | * 5/2006 | Ingram et al. | 701/103 |

FOREIGN PATENT DOCUMENTS

| | | |
|---|---|---|
| JP | 5-321809 | 12/1993 |
| JP | 8-74653 | 3/1996 |
| JP | 8-319874 | 12/1996 |
| JP | 2004-76624 | 3/2004 |

* cited by examiner

ENGINE PROTECTION SYSTEM AND METHOD FOR CONSTRUCTION MACHINE

TECHNICAL FIELD

The present invention relates to a construction machine, such as a hydraulic excavator, equipped with a multi-cylinder engine. More particularly, the present invention relates to an engine protection system and method for a construction machine, which are adapted to diagnose a tendency of exhaust temperature of each cylinder of the engine.

BACKGROUND ART

In a construction machine such as a hydraulic excavator, generally, a front operating mechanism which is made up of a boom, an arm, a bucket, etc., and a swing body are operated by hydraulic actuators, e.g., hydraulic cylinders and hydraulic motors. Those hydraulic actuators are operated with supply of a hydraulic fluid from a hydraulic pump driven by an engine. The engine includes a fuel injector for injecting fuel into a combustion chamber (cylinder), and a governor mechanism for controlling the fuel injector. The fuel injection amount, the injection timing, etc. are controlled for control of engine output power.

When work environments (such as open air temperature, altitude, and solar radiation) of a construction machine are changed or when a work load is increased, or if any abnormality occurs in the engine, the exhaust temperature of the engine may rise correspondingly. If the exhaust temperature exceeds an allowable temperature in that situation, there occurs a possibility that engine parts (specifically, engine cylinders, an exhaust manifold, etc.) are damaged.

Hitherto, a method for avoiding such a possibility has been proposed which comprises the steps of detecting the exhaust temperature by a temperature sensor disposed in, e.g., an exhaust manifold, totalizing not only the number of times that the exhaust temperature has exceeded a first setting temperature at which the exhaust manifold may cause thermal fatigue, but also periods of time during which the exhaust temperature has exceeded a second setting temperature which is higher than the first setting temperature and at which the exhaust manifold may cause fracture due to oxidation, and issuing an alarm, reducing the fuel injection amount, or modifying the injection timing when the number of times of the excesses over the first setting temperature becomes over a predetermined value, or when the time representing the excess over the second setting temperature becomes over a predetermined time (see, e.g., Patent Document 1). In that prior art, a rise of the exhaust temperature is suppressed by reducing the fuel injection amount, or modifying the injection timing.
Patent Document 1: JP,A 8-319874

DISCLOSURE OF THE INVENTION

Problems to be Solved by the Invention

However, the above-mentioned prior art has problems as follows.

For example, an engine mounted in a large-sized hydraulic excavator, etc. is a multi-cylinder engine having 12 cylinders or so. When one of the engine cylinders is failed for some reason, the multi-cylinder engine operates such that deficiency of engine output power caused by the failure is considerably compensated by the other engine cylinders. In an engine having a larger number of cylinders, therefore, a reduction in output power of the entire engine caused upon a failure of one cylinder is smaller and the failure is recognized with a longer delay. This may impose an overload on the other engine cylinders and give rise to a fatal failure.

Further, a large-sized hydraulic excavator is used for, e.g., excavation of earth and stones in a very wide work site and is in general continuously operated for the purpose of increasing productivity. Accordingly, if the above-mentioned failure occurs, production work performed by the failed machine is interrupted and operation management of a production schedule has to be modified. For that reason, it is required to find an abnormal condition of each engine cylinder (or a symptom prior to the occurrence of a failure) before the engine is fatally failed and stopped. However, because there are generally variations in characteristics of not only the entire engine, but also the individual cylinders, a difficulty has existed in determining based on the exhaust temperature, for example, whether the engine cylinder is abnormal, and in finding the abnormal condition of each engine cylinder in advance.

An object of the present invention is to provide an engine protection system and method for a construction machine, which can individually diagnose a tendency of exhaust temperature specific to each cylinder of an engine corresponding to an engine revolution speed, and can find an abnormal condition of each engine cylinder in advance.

Means for Solving the Problems (1) To achieve the above object, the present invention provides an engine protection system for a construction machine, the system comprising revolution speed detecting means for detecting a revolution speed of an engine mounted in the construction machine, a plurality of cylinder temperature detecting means for detecting exhaust temperatures of respective cylinders of the engine, storage means for storing the detected engine revolution speed and the detected exhaust temperatures of the respective cylinders while keeping temporal relationship, and control means for outputting a display signal computed based on the stored data.

In the present invention, the revolution speed detecting means detects the revolution speed of the engine, and the plurality of cylinder temperature detecting means detect the exhaust temperatures of the respective cylinders of the engine. The detected engine revolution speed and the detected exhaust temperatures of the respective cylinders are stored in the storage means while keeping temporal relationship. The control means outputs a display signal computed based on the stored data, to thereby display desired data. As a result, a supervisor or an operator is able to recognize a normal condition of the exhaust temperature specific to each engine cylinder corresponding to the engine revolution speed, to diagnose a tendency of the exhaust temperature specific to each engine cylinder in comparison with the normal condition, and to find an abnormal condition of each engine cylinder in advance.

(2) In above (1), preferably, the control means includes trend data processing means for extracting, from the stored data, the exhaust temperature of each cylinder at a predetermined engine revolution speed, computing at least one of an average value and a standard deviation of the exhaust temperature of each cylinder per a predetermined time based on the extracted data, producing and storing trend data representing time-varying changes of at least one of the average value and the standard deviation of the exhaust temperature of each cylinder, and outputting a display signal for displaying the produced trend data to the outside of the construction machine.

In the present invention, the trend data processing means produces the trend data representing the time-varying changes (i.e., changes per the predetermined time) of at least one of the average value and the standard deviation of the exhaust temperature of each cylinder at the predetermined engine revolution speed, and stores the produced trend data in the storage means. Further, the trend data processing means transmits the produced trend data to, e.g., an office for supervising the operating state of the construction machine, etc. via information communication, e.g., satellite communication, to be displayed therein. As a result, a supervisor in the office is able to recognize a normal condition of at least one of the average value and the standard deviation of the exhaust temperature specific to each engine cylinder at the predetermined engine revolution speed, to diagnose a tendency of at least one of the average value and the standard deviation of the exhaust temperature specific to each engine cylinder in comparison with the normal condition, and to find an abnormal condition of each engine cylinder in advance.

(3) In above (1) or (2), preferably, the engine protection system further comprises a display unit disposed in a cab of the construction machine, and the control means includes snapshot processing means for producing and storing snapshots extracted from the stored data within a predetermined time in accordance with a command from an operator, and outputting, to the display unit, a playback display signal for playing back and displaying progression of the stored snapshots in accordance with a command from the operator.

In the present invention, when the operator manipulates operating means with intent to produce snapshots, the snapshot processing means produces and stores the snapshots extracted from the stored data (the engine revolution speed and the exhaust temperature of each cylinder) within the predetermined time in accordance with the operator's command. Further, when the operator periodically repeats that operation command, the snapshot processing means stores plural sets of snapshots in the storage means. In addition, when the operator manipulates the operating means with intent to play back and display the snapshots, the snapshot processing means outputs, to the display unit in the cab, the playback display signal for the snapshots selected in accordance with the operator's command, whereby the selected snapshots are played back and displayed on the display unit. As a result, the operator in the cab can make comparison of the exhaust temperatures of the individual engine cylinders corresponding to the engine revolution speed while looking at progression (continuous changes) of the plural sets of snapshots. Hence the operator can diagnose the exhaust temperature specific to each cylinder corresponding to the engine revolution speed in comparison with the preceding one, and can find an abnormal condition of each engine cylinder in advance.

(4) In any one of above (1) to (3), preferably, the engine protection system further comprises first abnormality determining means for determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and outputting an abnormality signal when the deviation is larger than the predetermined threshold.

(5) In any one of above (1) to (3), more preferably, the engine protection system for the construction machine according to any one of claims 1 to 3 further comprises second abnormality determining means for determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and determining a kind of abnormality and outputting an abnormality signal when the deviation is larger than the predetermined threshold.

(6) To achieve the above object, the present invention also provides an engine protection method for a construction machine equipped with a multi-cylinder engine, the method comprising the steps of storing an engine revolution speed detected by revolution speed detecting means and exhaust temperatures of respective cylinders detected by a plurality of cylinder temperature detecting means while keeping temporal relationship, and outputting a display signal computed based on the stored data to display means.

(7) In above (6), preferably, the engine protection method further comprises the steps of extracting, from the stored data, the exhaust temperature of each cylinder at a predetermined engine revolution speed, computing at least one of an average value and a standard deviation of the exhaust temperature of each cylinder per a predetermined time based on the extracted data, producing and storing trend data representing time-varying changes of at least one of the average value and the standard deviation of the exhaust temperature of each cylinder, and outputting a display signal for displaying the produced trend data to the outside of the construction machine.

(8) In above (6) or (7), preferably, the engine protection method further comprises the steps of producing and storing snapshots extracted from the stored data within a predetermined time in accordance with a command from an operator, and outputting, to the display unit disposed in a cab of the construction machine, a playback display signal for playing back and displaying progression of the stored snapshots in accordance with a command from the operator.

(9) In any one of above (6) to (8), preferably, the engine protection method further comprises the steps of determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and notifying an abnormality when the deviation is larger than the predetermined threshold.

(10) In any one of above (6) to (8), preferably, the engine protection method further comprises the steps of determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and determining a kind of abnormality and notifying the abnormality when the deviation is larger than the predetermined threshold.

Advantages of the Invention

According to the present invention, it is possible to individually diagnose a tendency of exhaust temperature specific to each cylinder of the engine corresponding to the engine revolution speed, and to find an abnormal condition of each engine cylinder in advance.

REFERENCE NUMERALS 14 revolution speed sensor (revolution speed detecting means)
17' engine monitoring unit (first abnormality determining means)
17" engine monitoring unit (second abnormality determining means)
20a-20p cylinder temperature sensor (cylinder temperature detecting means)
23 display unit
24 display controller (storage means, control means, and snapshot processing means)
26 data recording unit (storage means, control means, and trend data processing means)

BEST MODE FOR CARRYING OUT THE INVENTION

One embodiment of the present invention will be described below with reference to the drawings.

Figure 1:
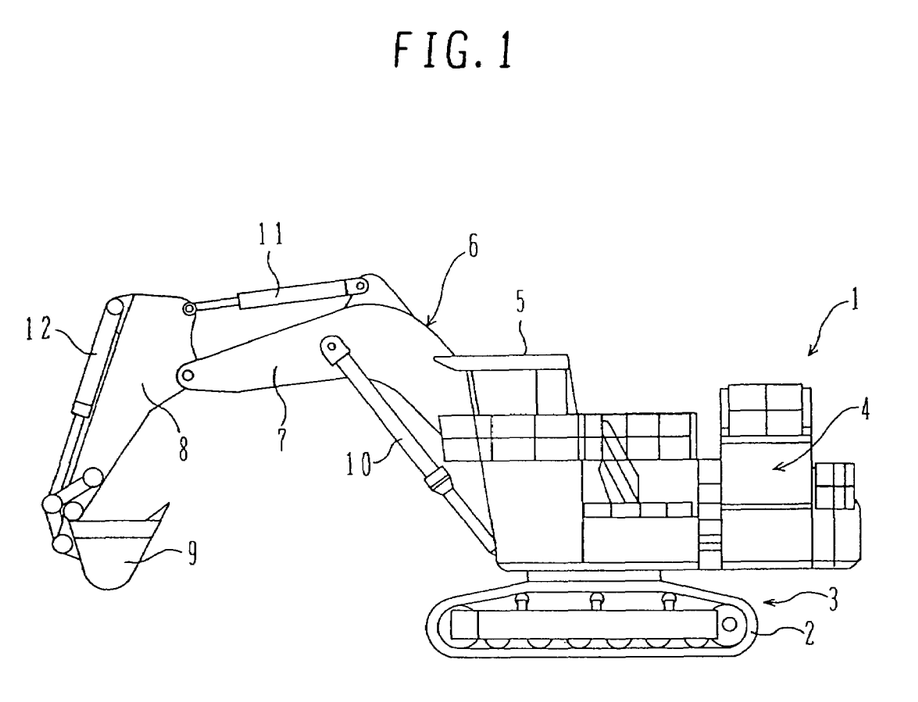
FIG. 1 is a side view showing an overall structure of a large-sized hydraulic excavator as one example of construction machines to which is applied an engine protection system for a construction machine according to the present invention.

FIG. 1 is a side view showing an overall structure of a large-sized hydraulic excavator as one example of construction machines to which is applied the present invention.

Referring to FIG. 1, reference numeral 1 denotes a large-sized hydraulic excavator, 2 denotes a caterpillar belt (crawler) serving as track means, and 3 denotes a track body equipped with the crawler 2 in each of left and right sides. Reference numeral 4 denotes a swing body mounted on the track body 3 in a swingable manner, 5 denotes a cab provided in a front portion of the swing body 4 in the left side, and 6 denotes a multi-articulated front operating mechanism (excavation device) mounted to a front central portion of the swing body 4 in up-and-down rotatable manner. The left and right crawlers 2 are operated by left and right track hydraulic motors (not shown), respectively, and the swing body 4 is operated with rotation of a swing hydraulic motor (not shown).

Reference numeral 7 denotes a boom mounted to the swing body 4 in a vertically rotatable manner, 8 denotes an arm mounted to a fore end of the boom 7 in a rotatable manner, and 9 denotes a bucket mounted to a fore end of the arm 8 in a rotatable manner. The front operating mechanism 6 is made up of the boom 7, the arm 8, and the bucket 9. The boom 7, the arm 8, and the bucket 9 are operated respectively by a boom hydraulic cylinder 10, an arm hydraulic cylinder 11, and a bucket hydraulic cylinder 12.

Figure 2:
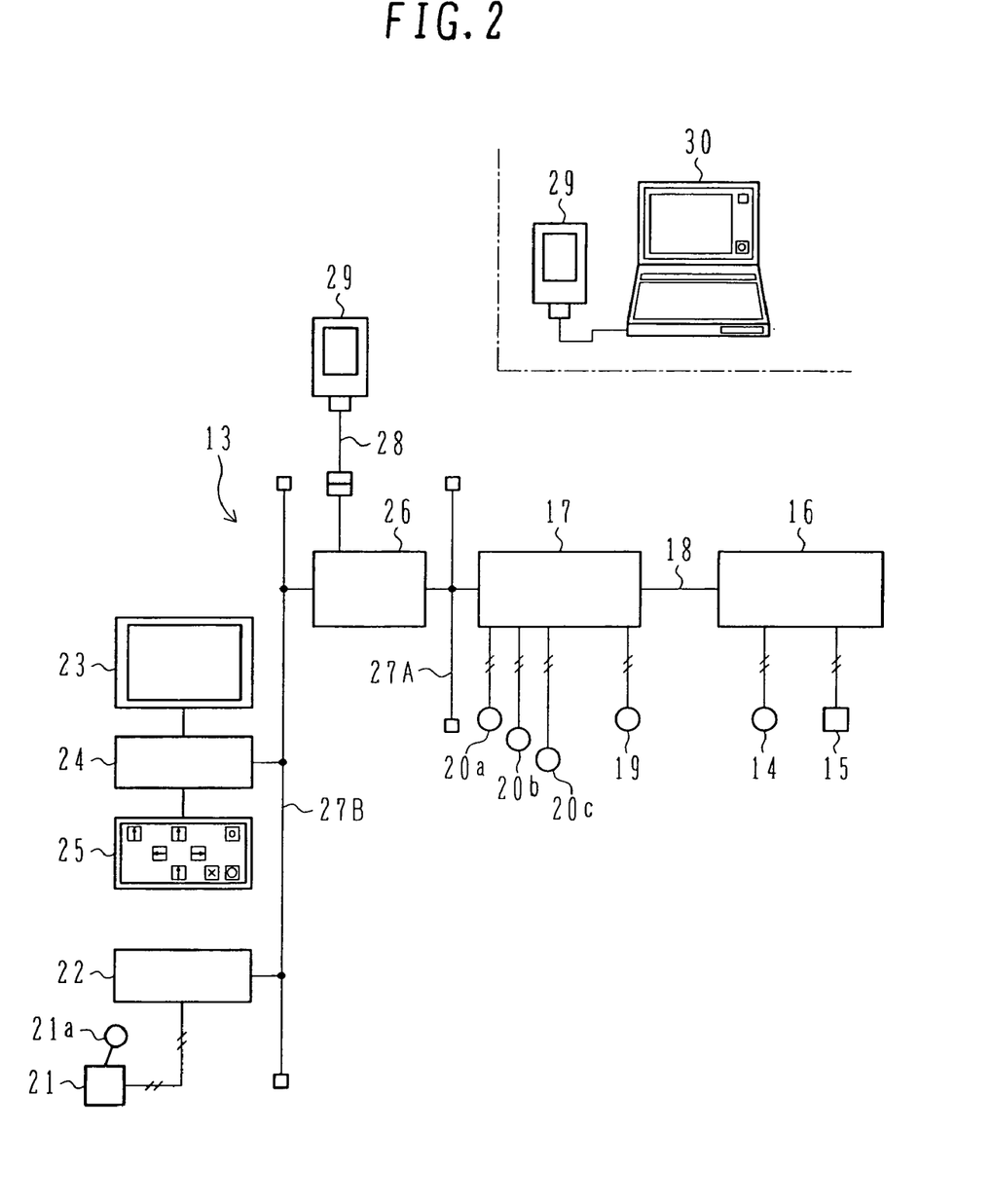
FIG. 2 is a circuit diagram showing one embodiment of the engine protection system for the construction machine according to the present invention along with a principal configuration of a controller network.

FIG. 2 is a circuit diagram showing one embodiment of the engine protection system in the construction machine according to the present invention along with a principal configuration of a controller network.

Referring to FIG. 2, reference numeral 13 denotes a controller network for collecting various items of operational information of the hydraulic excavator 1, and 14 denotes a revolution speed sensor for detecting the revolution speed of a diesel engine (not shown) having 16 cylinders, for example. Reference numeral 15 denotes a fuel injector of the so-called electronic governor type, and 16 denotes an engine controller which receives detected signals from the revolution speed sensor 14, etc. and which controls the fuel injector 15 for control of the engine revolution speed.

Reference numeral 17 denotes an engine monitoring unit which is connected to the engine controller 16 via serial communication 18 and which receives detected signals from various sensors for detecting status variables regarding the engine. Reference numeral 19 denotes an exhaust temperature sensor disposed in an exhaust manifold (not shown) of the engine, and 20a-20p denote cylinder temperature sensors disposed in number 16, for example, in the exhaust side of the engine cylinders (not shown) (only three 20a, 20b and 20c of those sensors are shown in FIG. 2 for the sake of brevity). Detected signals from the exhaust temperature sensor 19 and the cylinder temperature sensors 20a-20p are inputted to the engine monitoring unit 17.

Reference numeral 21 denotes each of control lever units (only one of which is typically shown in FIG. 2) including control levers 21a for instructing operations of the hydraulic actuators (specifically the left and right track hydraulic motors, the swing hydraulic motor, the boom hydraulic cylinder 10, the arm hydraulic cylinder 11, the bucket hydraulic cylinder 12, etc.). The control lever unit 21 produces an operating signal corresponding to the operation (i.e., the direction and the amount of a shift) of the associated control lever 21a. Reference numeral 22 denotes an electric lever control unit for receiving the operating signals from the control lever units 21, executing predetermined arithmetic and logical operations on the received operating signals to produce drive signals (control signals), and outputting the produced drive signals to solenoid proportional pressure reducing valves (not shown).

Reference numeral 23 denotes a display unit (display) disposed in the cab 5 and displaying, to a driver (operator), various items of operational information of the hydraulic excavator 1 (i.e., status variables regarding a later-described engine system, an operating system, a hydraulic system, etc.), alarm information and so on. Reference numeral 24 denotes a display controller for controlling display provided by the display unit 23. Reference numeral 25 denotes a keypad connected to the display controller 24 and used for, e.g., setting various data and changing over screen images with input operations by the operator.

Reference numeral 26 denotes a data recording unit which is connected to the engine monitoring unit 17 via a first network 27A and is connected to the display controller 24, the electric lever controller 22, and others (such as a hydraulic controller for performing hydraulic control of the hydraulic pump which is driven by the engine and supplys the hydraulic fluid to the hydraulic actuators) via a second network 27B.

The display controller 24 and the data recording unit 26 receive successively (e.g., per 1 sec) status variables regarding the engine system of the hydraulic excavator 1 from the engine controller 16, the engine monitoring unit 17, etc., status variables regarding the operating system from the electric lever controller 22, and others (such as status variables regarding the hydraulic system from the hydraulic controller), and then store the received variable status data while keeping temporal relationship.

A first major feature of this embodiment resides in that the data recording unit 26 extracts, from the stored status variable data, the exhaust temperature of each cylinder at a predetermined engine revolution speed (e.g., a rated revolution speed), computes an average value and a standard deviation of the exhaust temperature of each cylinder per a predetermined time (e.g., 30 minutes) based on the extracted data, and produces and stores trend data representing time-varying changes (e.g., changes per 30 minutes) of the average value and the standard deviation of the exhaust temperature of each cylinder. Further, the produced trend data is downloaded for transfer to a portable terminal 29 from the data recording unit 26 via a serial communication 28, or is transmitted via a satellite communication terminal (not shown), followed by being outputted to, e.g., a PC terminal 30 disposed in an office or the like managing the operating state of the hydraulic excavator 1.

A second major feature of this embodiment resides in that the display controller 24 produces and stores snapshots of the engine revolution speed, the exhaust temperature of each cylinder, etc., which are extracted from the stored status variable data within a predetermined time (e.g., a time within 30 minutes at maximum specified by an input from the operator), in accordance with a command signal from the keypad 25 operated by the operator. Also, the display controller 24 outputs, to the display unit 23, a playback display signal for playing back and displaying progression (e.g., changes per second) of the stored snapshots in accordance with a command signal from the keypad 25 operated by the operator.

In the foregoing description, the revolution speed sensor 14 constitutes revolution speed detecting means, stated in Claims, for detecting a revolution speed of an engine mounted in a construction machine, and the cylinder temperature sensors 20a-20p constitute a plurality of cylinder temperature detecting means, stated in Claims, for detecting exhaust temperatures of respective cylinders of the engine.

The data recording unit 26 constitutes not only storage means for storing the detected engine revolution speed and the detected exhaust temperatures of the respective cylinders while keeping temporal relationship, but also control means for outputting a display signal computed based on the stored data. Further, the data recording unit 26 constitutes trend data processing means for extracting, from the stored data, the exhaust temperature of each cylinder at a predetermined engine revolution speed, computing at least one of an average value and a standard deviation of the exhaust temperature of each cylinder per a predetermined time based on the extracted data, producing and storing trend data representing time-varying changes of at least one of the average value and the standard deviation of the exhaust temperature of each cylinder, and outputting a display signal for displaying the produced trend data to the outside of the construction machine.

The display controller 24 constitutes not only the storage means for storing the detected engine revolution speed and the detected exhaust temperatures of the respective cylinders while keeping temporal relationship, but also the control means for outputting the display signal computed based on the stored data. Further, the display controller 24 constitutes snapshot processing means for producing and storing snapshots extracted from the stored data within a predetermined time in accordance with a command from an operator, and outputting, to the display unit, a playback display signal for playing back and displaying progression of the stored snapshots in accordance with a command from the operator.

The operation and advantages in practical use of this embodiment will be described below.

When the operator starts driving of the engine of the hydraulic excavator 1 with intent to perform excavation, for example, the engine revolution speed reaches, e.g., the rated engine revolution speed, and the exhaust temperature of each engine cylinder rises. The revolution speed sensor 14 detects the engine revolution speed, and the cylinder temperature sensors 20a-20p detect the exhaust temperatures of the respective engine cylinders. These detected signals are inputted to and stored in the data recording unit 26 and the display controller 24.

The data recording unit 26 computes, from the stored status variable data, the average value and the standard deviation of the exhaust temperature of each cylinder per, e.g., 30 minutes at the rated engine revolution speed, and produces and stores the trend data representing changes of the average value and the standard deviation of the exhaust temperature of each cylinder per 30 minutes. Further, the produced trend data is transmitted via the portable terminal 29, for example, to the office managing the operating state, etc. of the construction machine and is displayed on the PC terminal 30 in the office.

Thus, a supervisor in the office can recognize a normal condition of the exhaust temperature specific to each cylinder at the rated engine revolution speed (e.g., a condition in a period where the accumulative operating time of the hydraulic excavator 1 is still small). Also, at that time, because the changes of the exhaust temperature data of each cylinder at the rated engine revolution speed per 30 minutes are displayed on the PC terminal 30, the supervisor can easily diagnose a tendency of the exhaust temperature specific to each engine cylinder and can find an abnormal condition of each engine cylinder in advance.

Also, when the operator manipulates the keypad 25 with intent to produce snapshots, the display controller 24 produces and stores the snapshots of the engine revolution speed, the exhaust temperature of each cylinder, etc., which are extracted from the stored status variable data within the predetermined time (30 minutes at maximum), in accordance with the command signal from the keypad 25. Further, when the operator repeats the command for producing the snapshots, the display controller 24 produces and stores plural sets of snapshots. In addition, when the operator manipulates the keypad 25 with intent to play back and display the snapshots, the display controller 24 outputs, to the display unit 23 in the cab 5, the playback display signal for the snapshots selected in accordance with the command signal from the keypad 25, whereby the selected snapshots are played back and displayed on the display unit 23.

As a result, the operator in the cab 5 can make comparison while looking at progression (changes per second) of the plural sets of snapshots. In other words, the operator can diagnose the exhaust temperature specific to each cylinder corresponding to the engine revolution speed in comparison with the preceding one, and can find an abnormal condition of each engine cylinder in advance.

According to this embodiment, therefore, the supervisor or the operator is able to recognize the normal condition of the exhaust temperature specific to each engine cylinder corresponding to the engine revolution speed, to diagnose a tendency of the exhaust temperature specific to each engine cylinder, and to find the abnormal condition of each engine cylinder in advance.

Another embodiment of the present invention will be described below with reference to FIGS. 3 and 4. This embodiment further includes means for individually determining the abnormal condition of each engine cylinder.

Figure 3:
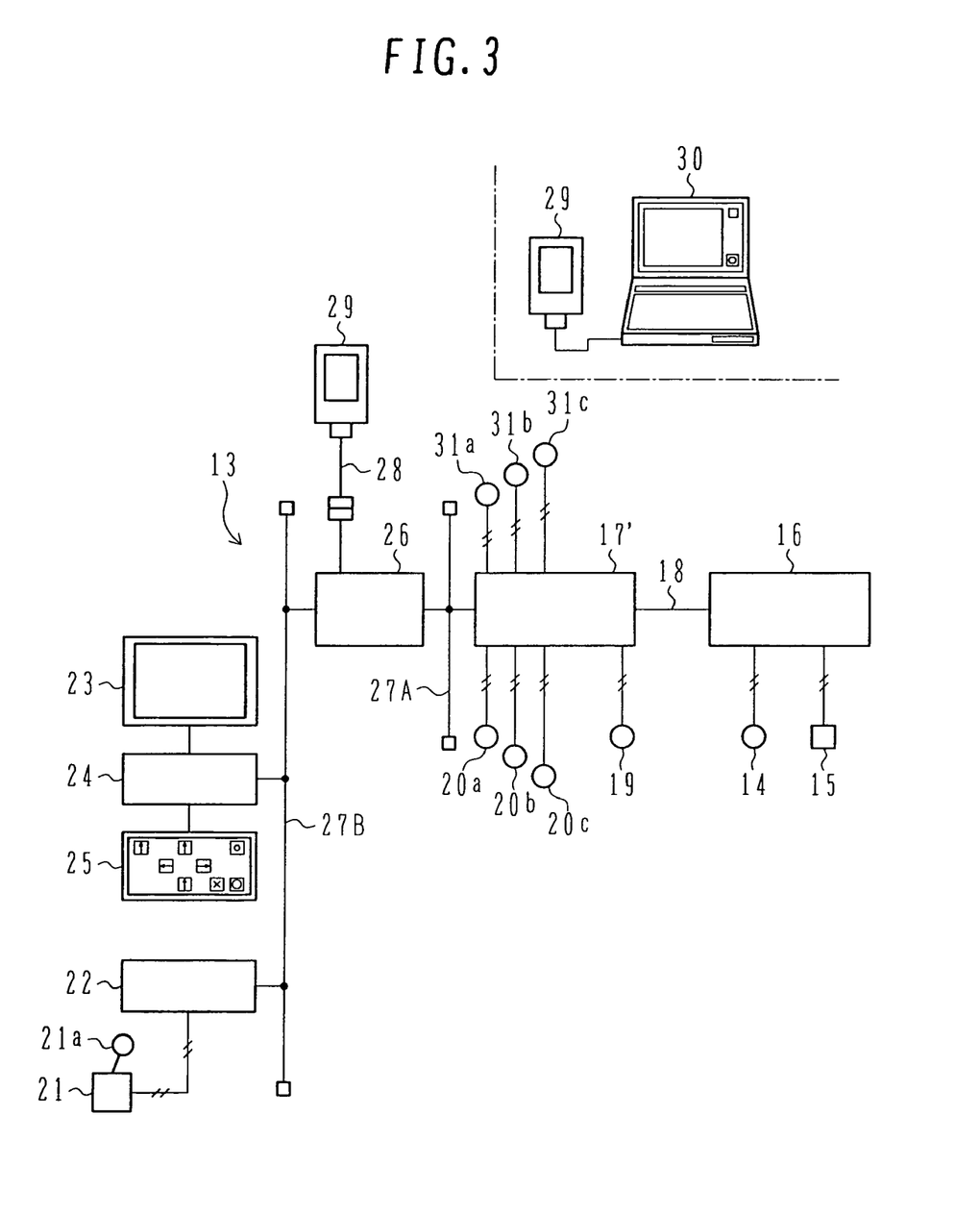
FIG. 3 is a circuit diagram showing another embodiment of the engine protection system for the construction machine according to the present invention along with the principal configuration of the controller network.

FIG. 3 is a circuit diagram showing the engine protection system for the construction machine according to this embodiment along with the principal configuration of the controller network. Similar components in FIG. 3 to those in the above-described embodiment are denoted by the same reference numerals and a description thereof is omitted unless specifically required.

In this embodiment, reference numerals 31a-31p denote abnormality notifying lamps which are disposed in number 16, for example, in the cab 5 (only three 31a, 31b and 32c of those lamps are shown in FIG. 3 for the sake of brevity), and which notify an abnormality in one-to-one relation to the engine cylinders. An engine monitoring unit 17' executes predetermined arithmetic and logical operations (described later) on the engine revolution speed from the revolution speed sensor 14 and the exhaust temperatures of the respective engine cylinders from the cylinder temperature sensors 20a-20p, and outputs a produced control signal (abnormality signal) to corresponding one of the abnormality notifying lamps 31a-31p.

Figure 4:
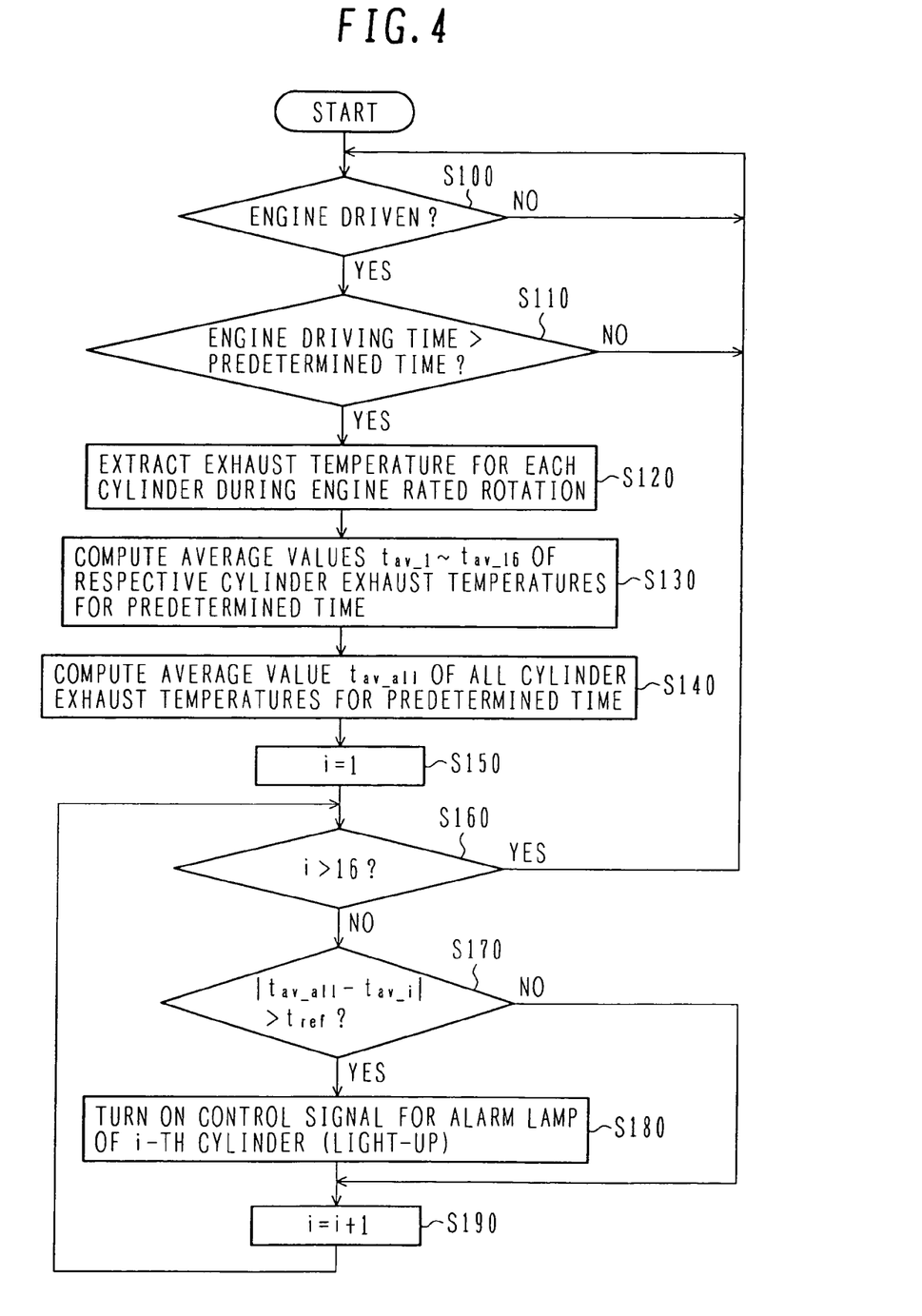
FIG. 4 is a flowchart showing steps of a control process executed by an engine monitoring unit which constitutes the other embodiment of the engine protection system for the construction machine according to the present invention.

FIG. 4 is a flowchart showing steps of a control process executed by the engine monitoring unit 17' in this embodiment.

Referring to FIG. 4, whether the engine is driven is first determined in step 100 from, e.g., the engine revolution speed detected by the revolution speed sensor 14. If it is determined that the engine is not driven, the determination of step 100 is not satisfied and this determination step is repeated. On the other hand, if it is determined that the engine is driven, the determination of step 100 is satisfied and the control flow proceeds to step 110. In step 110, an engine driving time is computed based on, e.g., the detected signal from the revolution speed sensor 14, and it is determined that the engine driving time is longer than a predetermined time (specifically a time during which the engine having started driving is stabilized, e.g., about 1 hour). If the engine driving time is shorter than the predetermined time, the determination of step 110 is not satisfied and the control flow returns to step 100 to repeat the above-described steps. On the other hand, if the engine driving time is longer than the predetermined time, the determination of step 110 is satisfied and the control flow proceeds to step 120.

In step 120, the exhaust temperatures of the respective cylinders at the rated engine revolution speed, for example, are extracted from the detected signals from the revolution speed sensor 14 and the cylinder exhaust temperature sensors 20a-20p. Then, the control flow proceeds to step 130 in which average values $t_{av\_1}$ to $t_{av\_16}$ of the exhaust temperatures of the respective cylinders per a predetermined time (e.g., 30 minutes) are computed. Thereafter, in step 140, an average value $t_{av\_all}$ of the exhaust temperatures of all the cylinders is computed per the same predetermined time (alternatively, this average value may be computed based on the detected signal from the exhaust temperature sensor 19). Further, the control flow proceeds to step 150 in which a cylinder calculation index i is initialized to i=1. In step 160, it is determined whether the cylinder calculation index i is larger than the number of cylinders (16 in this embodiment). Because the cylinder calculation index i is 1 (i=1) and smaller than 16, i.e., the number of cylinders, at the beginning, the determination of step 160 is not satisfied and the control flow shifts to step 170.

In step 170, because of the cylinder calculation index i=1, it is determined whether a deviation $|t_{av\_all}-t_{av\_1}|$ between the average value $t_{av\_1}$ of the exhaust temperature of the first cylinder and the average value $t_{av\_all}$ of the exhaust temperatures of all the cylinders is larger than a predetermined threshold $t_{ref}$. If $|t_{av\_all}-t_{av\_1}|>t_{ref}$, the determination of step 170 is satisfied and the control flow shifts to step 180. In step 180, because of the cylinder calculation index i=1, a control signal for the abnormality notifying lamp 31a corresponding to the first cylinder is turned on to light up the abnormality notifying lamp 31a. The control flow then shifts to step 190. If $|t_{av\_all}-t_{av\_1}| \leq t_{ref}$ holds in step 170, the determination of step 170 is not satisfied and the control flow shifts to step 190. In step 190, the cylinder calculation index i is incremented by 1 (i.e., i=1+1=2), following which the control flow shifts to step 160.

Subsequently, steps 160-190 are repeated until the cylinder calculation index reaches 16 after successive increment to i=2, 3, . . . , 16. In other words, similar procedures to the above-described ones are repeated for the second to sixteenth cylinders. If the cylinder calculation index reaches 17 (i=16+ 1=17) and becomes larger than 16, i.e., the number of cylinders, in step 190, the determination of step 160 is satisfied and the control flow returns to step 100 to repeat similar procedures to the above-described ones.

Also, through similar control procedures to ones described above with reference FIG. 4, the engine monitoring unit 17' executes the steps of extracting the exhaust temperatures of the respective cylinders at, e.g., the rated engine revolution speed, computing a standard deviation of the exhaust temperature of each cylinder and a standard deviation of the exhaust temperatures of all the cylinders per a predetermined time (e.g., 30 minutes), determining per cylinder whether a deviation between the standard deviation of the exhaust temperature of each cylinder and the standard deviation of the exhaust temperatures of all the cylinders is larger than a predetermined threshold, and turning on a control signal for the abnormality notifying lamp (any one of 31a-31p) corresponding to the relevant cylinder when the deviation is larger than the predetermined threshold, to thereby light up the corresponding abnormality notifying lamp. Though not shown, the engine monitoring unit 17' may further execute, for example, the steps of determining whether respective deviations of the average value and the standard deviation of the exhaust temperature of each engine cylinder from the average value and the standard deviation of the exhaust temperatures of all the cylinders are larger than a predetermined threshold, and turning on the control signal for the abnormality notifying lamp corresponding to the relevant cylinder when both the deviations are larger than the predetermined threshold, to thereby light up the corresponding abnormality notifying lamp.

In the foregoing description, the engine monitoring unit 17' constitutes first abnormality determining means, stated in Claims, for determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and outputting an abnormality signal when the deviation is larger than the predetermined threshold.

According to this embodiment thus constituted, the engine monitoring unit 17' comparatively diagnoses the exhaust temperature specific to each cylinder corresponding to the engine revolution speed, and when an abnormality is detected in any of engine cylinders, it lights up the corresponding abnormality notifying lamp. Therefore, the operator can find the abnormal condition of each engine cylinder in advance.

Furthermore, the engine monitoring unit may diagnose the exhaust temperature of each cylinder depending on the engine load state and determine the kind of abnormality. Such a modification will be described below with reference to FIG. 5.

Figure 5:
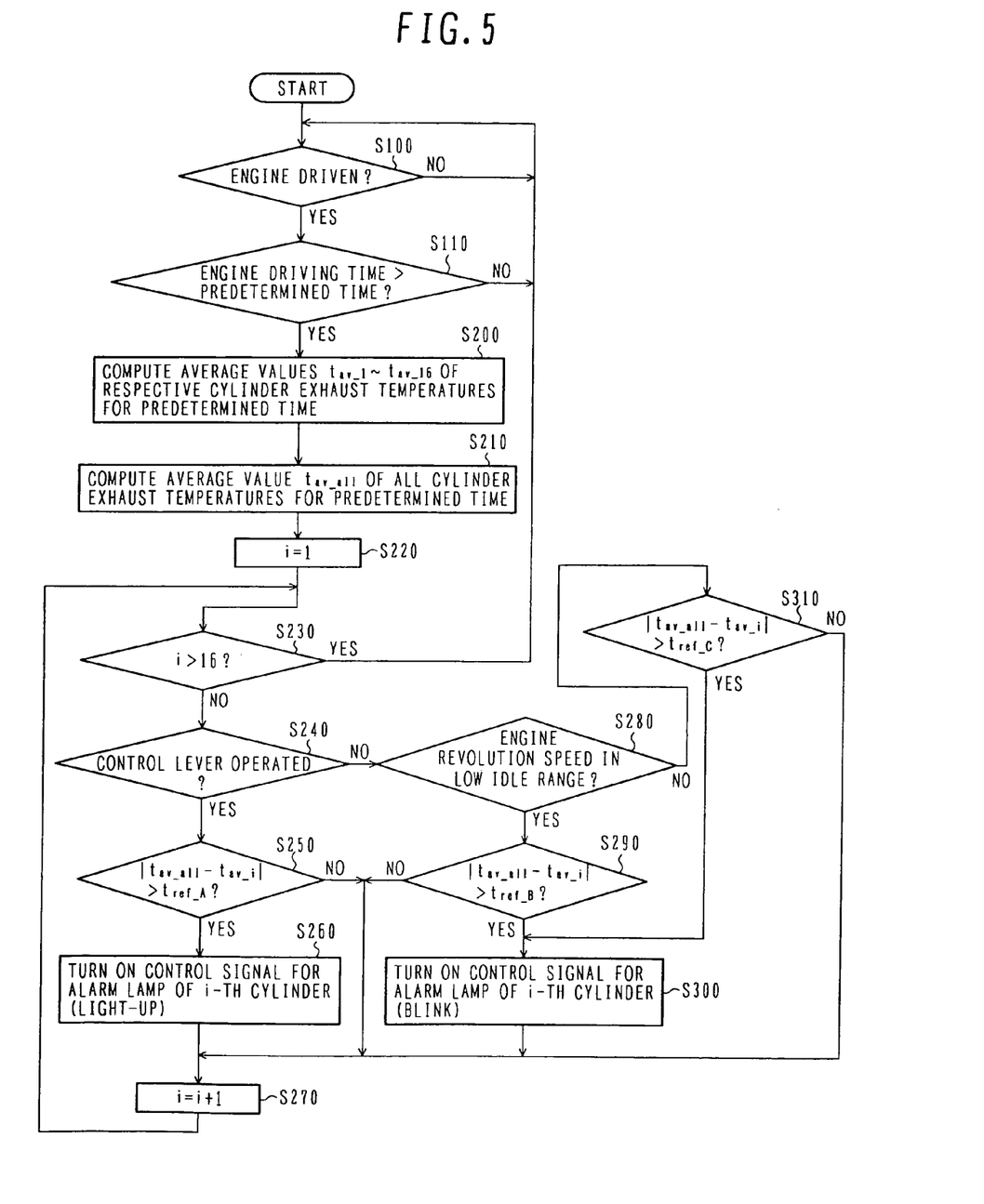
FIG. 5 is a flowchart showing steps of a control process executed by an engine monitoring unit which constitutes one modification of the engine protection system for the construction machine according to the present invention.

FIG. 5 is a flowchart showing steps of a control process executed by an engine monitoring unit 17" (not shown) according to the modification. Similar steps in FIG. 5 to those in the above-described embodiment are denoted by the same reference numerals and a description thereof is omitted unless specifically required.

Referring to FIG. 5, if the engine driving time is longer than the predetermined time, the determination of step 110 is satisfied after step 100 and the control flow shifts to step 200.

In step 200, average values $t_{av\_1}$ to $t_{av\_16}$ of the exhaust temperatures of the respective cylinders per a predetermined time (e.g., 30 minutes) are computed. Thereafter, in step 210, an average value $t_{av\_all}$ of the exhaust temperatures of all the cylinders is computed per the same predetermined time (alternatively, this average value may be computed based on the detected signal from the exhaust temperature sensor 19). Further, the control flow proceeds to step 220 in which a cylinder calculation index i is initialized to i=1. In step 230, it is determined whether the cylinder calculation index i is larger than the number of cylinders (16 in this embodiment). Because the cylinder calculation index i is 1 (i=1) and smaller than 16, i.e., the number of cylinders, at the beginning, the determination of step 230 is not satisfied and the control flow shifts to step 240.

In step 240, to judge as to if a predetermined load is imposed on the engine, it is determined whether the control lever 21a or another one is operated by a detected signal from the electric lever controller 22 via a signal line (not shown). If the control lever 21a or another one is operated (namely, if the predetermined load is imposed on the engine), the determination of step 240 is satisfied and the control flow shifts to step 250.

In step 250, because of the cylinder calculation index i=1, it is determined whether a deviation $|t_{av\_all}-t_{av\_1}|$ between the average value $t_{av\_1}$ of the exhaust temperature of the first cylinder and the average value $t_{av\_all}$ of the exhaust temperatures of all the cylinders is larger than a predetermined first threshold $t_{ref\_A}$. If $|t_{av\_all}-t_{av\_1}|>t_{ref\_A}$, the determination of step 250 is satisfied and the control flow shifts to step 260. In step 260, because of the cylinder calculation index i=1, a control signal for the abnormality notifying lamp 31a corresponding to the first cylinder is turned on to light up the abnormality notifying lamp 31a (thereby issuing a fuel injection amount increase alarm). The control flow then shifts to step 270. The term "fuel injection amount increase alarm" means an alarm indicating that fuel is no longer normally injected due to, e.g., breakage of the tip of a fuel injection nozzle and the fuel injection amount is increased. If such a situation is left as it is, seizure of an engine piston or other trouble may occur. If $|t_{av\_all}-t_{av\_1}|\leq t_{ref\_A}$ holds in step 250, the determination of step 250 is not satisfied and the control flow shifts to step 270.

On the other hand, if the control lever 21a and others are not operated in step 240 (namely, if the predetermined load is not imposed on the engine), the determination of step 240 is not satisfied and the control flow shifts to step 280. In step 280, it is determined whether the engine revolution speed is in a low idle range. If the engine revolution speed is in the low idle range, the determination of step 280 is satisfied and the control flow shifts to step 290. In step 290, if the cylinder calculation index i is 1 (i=1), it is determined whether the deviation $|t_{av\_all}-t_{av\_1}|$ between the average value $t_{av\_1}$ of the exhaust temperature of the first cylinder and the average value $t_{av\_all}$ of the exhaust temperatures of all the cylinders is larger than a predetermined second threshold $t_{ref\_B}$. If $|t_{av\_all}-t_{av\_1}|>t_{ref\_B}$, the determination of step 290 is satisfied and the control flow shifts to step 300. In step 300, if the cylinder calculation index i is 1 (i=1), a control signal for the abnormality notifying lamp 31a corresponding to the first cylinder is turned on to blink the abnormality notifying lamp 31a (thereby issuing a valve-opening pressure drop alarm). The term "valve-opening pressure drop alarm" means an alarm indicating that, for example, a spring for retaining a needle valve of the fuel injection nozzle is worn and the valve opening pressure is dropped. Such an alarm gives a basis for judging the necessity of overhaul of the injection nozzle. The control flow then shifts to step 270. If $|t_{av\_all}-t_{av1}|\leq t_{ref\_B}$ holds in step 290, the determination of step 290 is not satisfied and the control flow shifts to step 270.

Further, if it is determined in step 280 that the engine revolution speed is in a high idle range, the determination of step 280 is not satisfied and the control flow shifts to step 310. In step 310, if the cylinder calculation index i is 1 (i=1), it is determined whether the deviation $|t_{av\_all}-t_{av\_1}|$ between the average value $t_{av\_1}$ of the exhaust temperature of the first cylinder and the average value $t_{av\_all}$ of the exhaust temperatures of all the cylinders is larger than a predetermined third threshold $t_{ref\_C}$ ($t_{ref\_C}<t_{ref\_B}$). If $|t_{av\_all}-t_{av\_1}|>t_{ref\_C}$, the determination of step 310 is satisfied and the control flow shifts to step 300 mentioned above. In step 300, if the cylinder calculation index i is 1 (i=1), a control signal for the abnormality notifying lamp 31a corresponding to the first cylinder is turned on to blink the abnormality notifying lamp 31a (thereby issuing the valve-opening pressure drop alarm). The control flow then shifts to step 270. If $|t_{av\_all}-t_{av\_1}|\leq t_{ref\_C}$ holds in step 310, the determination of step 310 is not satisfied and the control flow shifts to step 270.

In step 270, the cylinder calculation index i is incremented by 1 (i.e., i=1+1=2), following which the control flow shifts to step 230. Subsequently, steps 230-310 are repeated until the cylinder calculation index reaches 16 after successive increment to i=2, 3, . . . , 16. In other words, similar procedures to the above-described ones are repeated for the second to sixteenth cylinders. If the cylinder calculation index reaches 17 (i=16+1=17) and becomes larger than 16, i.e., the number of cylinders, in step 270, the determination of step 230 is satisfied and the control flow returns to step 100 to repeat similar procedures to the above-described ones.

Also, through similar control procedures to ones described above with reference FIG. 5, the engine monitoring unit 17" executes the steps of computing a standard deviation of the exhaust temperature of each cylinder and a standard deviation of the exhaust temperatures of all the cylinders per a predetermined time (e.g., 30 seconds), determining per cylinder whether a deviation between the standard deviation of the exhaust temperature of each cylinder and the standard deviation of the exhaust temperatures of all the cylinders is larger than a predetermined threshold depending on the engine load, and turning on a control signal for the abnormality notifying lamp (any one of 31a-31p) corresponding to the relevant cylinder when the deviation is larger than the predetermined threshold, to thereby light up or blink the corresponding abnormality notifying lamp. Though not shown, the engine monitoring unit 17" may further execute, for example, the steps of determining whether respective deviations of the average value and the standard deviation of the exhaust temperature of each engine cylinder from the average value and the standard deviation of the exhaust temperatures of all the cylinders are larger than a predetermined threshold depending on the engine load, and turning on the control signal for the abnormality notifying lamp corresponding to the relevant cylinder when both the deviations are larger than the predetermined threshold, to thereby light up or blink the corresponding abnormality notifying lamp.

In the foregoing description, the engine monitoring unit 17" constitutes second abnormality determining means, stated in Claims, for determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and determining a kind of abnormality and outputting an abnormality signal when the deviation is larger than the predetermined threshold.

According to this modification thus constituted, since the exhaust temperature of each cylinder is diagnosed depending on the engine load state to determine and notify the occurrence of abnormality such as the fuel injection amount increase and the valve-opening pressure drop, the operator can easily visually recognize the abnormal condition of each engine cylinder. Hence the operator can find the abnormal condition of each engine cylinder in advance as in the above-described embodiments.

While the other embodiment and one modification have been described above in connection with the case of lighting up the abnormality notifying lamps 31a-31p by the control signal from the engine monitoring unit 17' or 17", the present invention is not limited to that case. More specifically, for example, the control process shown in FIG. 4 or 5 may be executed by the data recording unit 24, and the abnormality notifying lamps 31a-31p may be light up by a control signal from the data recording unit 24. Such a modification can also provide a similar advantage to the above-described one. Also, the display unit may be constituted by using, e.g., a liquid crystal to display characters or the Morse code, instead of the abnormality notifying lamps 31a-31p.

While the above description has been made in connection with the hydraulic excavator as one example of construction machines, the construction machines are not limited to the hydraulic excavator. The present invention can also be applied to other types of construction machines, such as a crawler crane and a wheel loader, and a similar advantage can be obtained in those applications.

The invention claimed is:

1. An engine protection system for a construction machine, said system comprising revolution speed detecting means for detecting a revolution speed of an engine mounted in the construction machine, a plurality of cylinder temperature detecting means for detecting exhaust temperatures of respective cylinders of said engine, storage means for storing the detected engine revolution speed and the detected exhaust temperatures of the respective cylinders while keeping temporal relationship, and control means for outputting a display signal computed based on the stored data;

wherein said control means includes trend data processing means for extracting, from the stored data, the exhaust temperature of each cylinder at a predetermined engine revolution speed, computing at least one of an average value and a standard deviation of the exhaust temperature of each cylinder per a predetermined time based on the extracted data, producing and storing trend data representing time-varying changes of at least one of the average value and the standard deviation of the exhaust temperature of each cylinder, and outputting a display signal for displaying the produced trend data to the outside of the construction machine.

2. The engine protection system for the construction machine according to claim 1, further comprising a display unit disposed in a cab of the construction machine, wherein said control means includes snapshot processing means for producing and storing snapshots extracted from the stored data within a predetermined time in accordance with a command from an operator, and outputting, to said display unit, a playback display signal far playing back and displaying progression of the stored snapshots in accordance with a command from the operator.

3. The engine protection system for the construction machine according to claim 1, further comprising first abnormality determining means for determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and outputting an abnormality signal when the deviation is larger than the predetermined threshold.

4. The engine protection system for the construction machine according to claim 1, further comprising second abnormality determining means for determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and determining a kind of abnormality and outputting an abnormality signal when the deviation is larger than the predetermined threshold.

5. An engine protection method for the construction machine equipped with a multi-cylinder engine, comprising the steps of storing an engine revolution speed detected by revolution speed detecting means and exhaust temperatures of respective cylinders detected by a plurality of cylinder temperature detecting means while keeping temporal relationship, and outputting a display signal computed based on the stored data to display means, and further comprising the steps of extracting, from the stored data, the exhaust temperature of each cylinder at a predetermined engine revolution speed, computing at least one of an average value and a standard deviation of the exhaust temperature of each cylinder per a predetermined time based on the extracted data, producing and storing trend data representing time-varying changes of at least one of the average value and the standard deviation of the exhaust temperature of each cylinder, and outputting a display signal for displaying the produced trend data to the outside of the construction machine.

6. The engine protection method for the construction machine according to claim 5, further comprising the steps of producing and storing snapshots extracted from the stored data within a predetermined time in accordance with a command from an operator, and outputting, to the display unit disposed in a cab of the construction machine, a playback display signal for playing back and displaying progression of the stored snapshots in accordance with a command from the operator.

7. The engine protection method for the construction machine according to claim 5, further comprising the steps of determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and notifying an abnormality when the deviation is larger than the predetermined threshold.

8. The engine protection method for the construction machine according to claim 5, further comprising the steps of determining whether a deviation of at least one of the average value and the standard deviation of the exhaust temperature of each cylinder, which are computed per the predetermined time, from corresponding one of an average value and a standard deviation of the exhaust temperatures of all the cylinders is larger than a predetermined threshold, and determining a kind of abnormality and notifying the abnormality when the deviation is larger than the predetermined threshold.

* * * * *